US008779872B2

(12) United States Patent
Jackson et al.

(10) Patent No.: US 8,779,872 B2
(45) Date of Patent: Jul. 15, 2014

(54) METHOD AND APPARATUS FOR INTEGRATED WAVEGUIDE TRANSMIT-RECEIVE ISOLATION AND FILTERING

(75) Inventors: Thomas Jackson, Monrovia, MD (US); Guo Chen, Vienna, VA (US); Larry Cronise, Spencerville, MD (US); Peter Hou, Germantown, MD (US); Barre Lankford, Sykesville, MD (US); Edmund Lott, Mount Airy, MD (US); Ross Thomson, Stamford, CT (US)

(73) Assignee: Hughes Network Systems, LLC, Germantown, MD (US)

( * ) Notice: Subject to any disclaimer, the term of this patent is extended or adjusted under 35 U.S.C. 154(b) by 498 days.

(21) Appl. No.: 13/078,113

(22) Filed: Apr. 1, 2011

(65) Prior Publication Data
US 2011/0243043 A1 Oct. 6, 2011

Related U.S. Application Data

(60) Provisional application No. 61/320,574, filed on Apr. 2, 2010.

(51) Int. Cl.
*H01P 5/12* (2006.01)
(52) U.S. Cl.
USPC ............ 333/126; 333/129; 333/132; 333/135
(58) Field of Classification Search
USPC ........................... 333/126–129, 132, 134, 135
See application file for complete search history.

(56) References Cited

U.S. PATENT DOCUMENTS

| | | | |
|---|---|---|---|
| 5,801,590 A * | 9/1998 | Kashima et al. | 331/68 |
| 5,959,592 A | 9/1999 | Petruzzelli | |
| 2002/0167449 A1 | 11/2002 | Frazita et al. | |
| 2003/0035386 A1 * | 2/2003 | Sullivan | 370/316 |
| 2006/0049977 A1 * | 3/2006 | Vacanti | 342/121 |
| 2007/0296518 A1 | 12/2007 | Avramis et al. | |
| 2009/0231186 A1 | 9/2009 | Barak et al. | |
| 2009/0309801 A1 | 12/2009 | Rao et al. | |
| 2010/0029199 A1 * | 2/2010 | Chen et al. | 455/14 |
| 2011/0243043 A1 | 10/2011 | Jackson et al. | |

FOREIGN PATENT DOCUMENTS

WO    WO2010/056609 A2    5/2010

OTHER PUBLICATIONS

Extended European Search Report for related European Application No. 11 17 8059 dated Jul. 12, 2012, pp. 1-8.
EP Application No. 11178057.3, "Extended European Search Report," Jul. 6, 2012.

* cited by examiner

*Primary Examiner* — Robert Pascal
*Assistant Examiner* — Kimberly Glenn
(74) *Attorney, Agent, or Firm* — Potomac Technology Law, LLC (57) ABSTRACT

A radio is provided for transmit-receive isolation and filtering (INTRIFWA) that are sealed and/or integrally built-in a housing of a transmitter, which can be used in microwave communication systems, including satellite based communications systems and terrestrial based microwave communication systems.

20 Claims, 10 Drawing Sheets

METHOD AND APPARATUS FOR INTEGRATED WAVEGUIDE TRANSMIT-RECEIVE ISOLATION AND FILTERING

RELATED APPLICATIONS

This application claims the benefit of the earlier filing date under 35 U.S.C. §119(e) of U.S. Provisional Application Ser. No. 61/320,574 filed Apr. 2, 2010, entitled "Method And Apparatus For Integrating Waveguide Transmit Receive Isolation And Filtering", the entirety of which is incorporated herein by reference.

BACKGROUND

Microwave communication systems (e.g., Satellite based communications, etc.) become popular, especially where asymmetrical digital subscriber lines (ADSL) and cables are not available. By way of example, fixed service satellite (FSS) systems have huge capacities with a relatively economical price structures, and the FSS systems provide various applications for subscribers, such as telephony, fax, television, high speed data communication services, Internet access, satellite news gathering (SNG), digital audio broadcasting (DAB), etc.

Existing radios of microwave communication systems employ either discrete waveguide devices, such as an orthomode transducer and a diplexer, or an assembly of the same each as stand-alone or a separate external module, both are exposed to the elements. There are many inherent disadvantages with this approach, including, e.g., susceptibility to water leakage, higher manufacturing costs, and relatively large volume and mass.

SOME EXAMPLE EMBODIMENTS

Therefore, there is a need for an approach a radio design that can overcome these disadvantages.

According to one embodiment, an apparatus comprises a transmitter configured to operate over a microwave link, a low noise block converter, and a transmit-receive isolation assembly. The apparatus also comprises a transmitter housing sealed therein at least a part of the low noise block converter, at least a part of the transmit-receive isolation assembly, or a combination thereof.

According to another embodiment, a method comprises providing an apparatus comprising a transmitter configured to operate over a microwave link, a low noise block converter, a transmit-receive isolation assembly, and a transmitter housing sealed therein at least a part of the low noise block converter, at least a part of the transmit-receive isolation assembly, or a combination thereof. The method also comprises performing transmit-receive isolation and filtering using the apparatus over a microwave link.

According to yet another embodiment, a method comprises metal die-casting a transmitter housing of the radio, wherein an inner surface of the transmitter housing is built-in with at least a part of a transmit-receive isolation assembly; and metal die-casting a plate having at least a part of the transmit-receive isolation assembly integrally built in a surface thereof.

Still other aspects, features and advantages of the embodiments are readily apparent from the following detailed description, simply by illustrating a number of particular embodiments and implementations, including the best mode contemplated for carrying out the embodiments. The disclosure also includes other and different embodiments, and its several details can be modified in various obvious respects, all without departing from the spirit and scope of the disclosure. Accordingly, the drawings and description are to be regarded as illustrative in nature, and not as restrictive.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A system, method, and apparatus for an integrated waveguide transmit-receive isolation and filtering device are described. In the following description, for the purposes of explanation, numerous specific details are set forth in order to provide a thorough understanding of the embodiments of the disclosure. It is apparent, however, to one skilled in the art that the embodiments of the disclosure may be practiced without these specific details or with an equivalent arrangement. In other instances, well-known structures and devices are shown in block diagram form in order to avoid unnecessarily obscuring the embodiments of the disclosure.

There are over three hundred communications satellites in the geostationary orbit. Subscribers can use a fixed pointing very small aperture terminal (VSAT) to communicate with the communications satellites.

Figure 1:
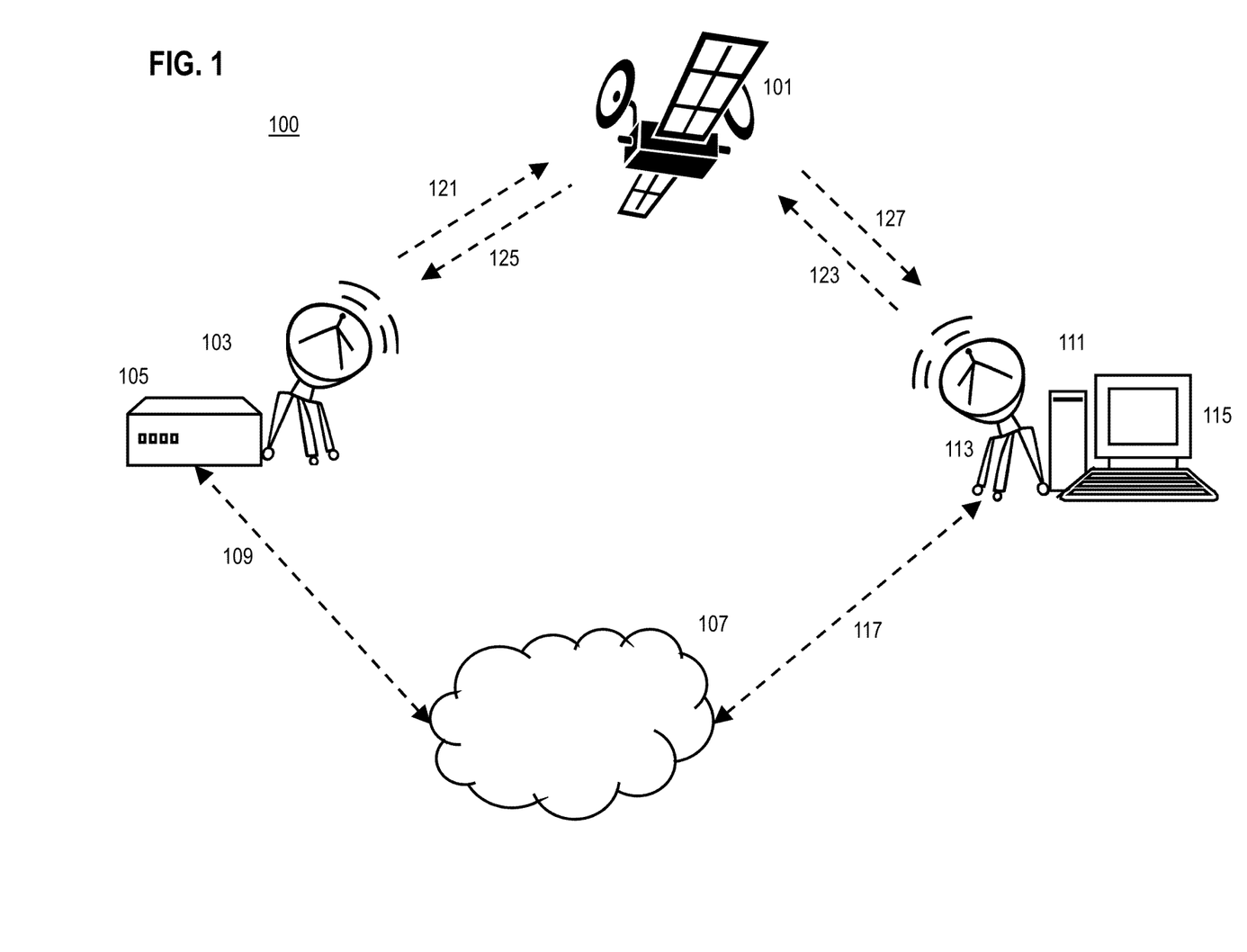
FIG. 1 is a diagram of a microwave communication system.

FIG. 1 is a diagram of a microwave communication system. The system 100 includes at least one satellite 101 and at least one center hub 103 connected via a server or base station 105 to a network 107. The connection 109 between the server or base station 105 to the network 107 can be wired, wireless, or a combination thereof. The network 107 includes one or more wired/data networks (e.g., LAN, MAN, WAN, the internet, etc.) and one or more wireless networks (e.g., TDMA, GSM, CDMA, GPRS, EDGE, MBMS, DVB, CSD, HSCSD, etc.).

The system 100 also includes a subscriber system 111. The subscriber system 111 include at least one remote ground terminal (e.g., VAST) 113 and a subscriber terminal 115. The subscribers may be individuals, business entities, governmental agencies, etc. The subscriber terminal 115 may comprise access points configured to communicate with other subscriber terminals in the network 107 in accordance with techniques such as, for example, radio frequency (RF), Bluetooth (BT), infrared (IrDA) or any of a number of different wireless networking techniques, including WLAN techniques. The connection 117 between the subscriber terminal 115 and the network 107 can be wired, wireless, or a combination thereof.

The remote ground terminal 113 is utilized at a remote location for communicating via the satellite 101 to the central hub 103. The central hub 103 communicates with multiple remote ground terminals, and has a significantly larger antenna, as well as a significantly larger power output capability than any of the remote ground terminals. The communication satellite 101 receives uplink signals 121 from the central hub 103 and uplink signals 123 from the remote ground based terminal 103. The communication satellite 101 transmits downlink signals 125 to the central hub 103 and downlink signals 127 to the ground based terminal 113. The communication satellite 101 preferably receives signals at a first frequency and transmits signals at a second frequency different from the first frequency.

A very small aperture terminal (VSAT) is a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites.

VSATs are most commonly used to transmit narrowband data (point of sale transactions such as credit card, polling or RFID data; or SCADA), or broadband data (for the provision of Satellite Internet access to remote locations, VoIP or video). VSATs are also used for transportable, on-the-move (utilizing phased array antennas) or mobile maritime communications. Very small aperture terminal (VSAT) remote terminals can be used to communicate data, voice and video, to or from a remote site to the central hub 103. The center hub 103 has a hub terminal equipment that includes an outdoor transceiver and antenna, indoor integrated modem and multiplexing systems, a single-cable intrafacility link, and a variety of network interfaces that can simultaneously deliver traffic to backbone in TDM, ATM, and IP format. Sectors can be provisioned for 1:N (e.g., N=4) active redundancy.

A VSAT may operate in frequency bands such as C band (4-6 GHz), Ku band (11-14 GHz), and Ka band (26.5-40 GHz). C band is ideal for heavy rain locations. Ku band is the most popular with dish sizes in the range 60 cm-1.8 m diameter. The Ka band satellite broadband services are rapidly expending.

Ku band is primarily used for satellite communications. Ku band satellites are also used for backhauls and particularly for satellite from remote locations back to a television network's studio for editing and broadcasting. The band is split into multiple segments that vary by geographical region by the International Telecommunication Union (ITU). Ku band systems require smaller dishes than C band because of their shorter wavelengths, (higher frequencies), which when combined with higher satellite transponder power and translates into smaller, cheaper antennas on the ground and therefore lower start up and transport costs. As the power increases, the dish's size can decrease. The smaller Ku Band dishes can be easily installed on almost any surface—the ground, roofs or bolted to the side of buildings. This is an important consideration for areas with limited space. Compared with C-band, Ku band is not similarly restricted in power to avoid interference with terrestrial microwave systems, and the power of its uplinks and downlinks can be increased. The satellite operator's earth station antenna requires more accurate position control when operating at Ku band than compared to C band.

New VSAT systems use Ka band technology that promises higher bandwidth rates for lower costs. Ka band dishes are smaller than Ku band dishes because of the even shorter wavelengths (higher Ka band frequencies) and higher satellite power. The higher frequencies of Ka band are significantly more vulnerable to signal quality problems caused by rainfall. Therefore, Ka band VSATs are usually unsuitable for mission critical or high availability systems in the tropical and sub-tropical regions without the provision of measures to combat adverse weather conditions.

Typically, a VSAT remote terminal has a small aperture directional antenna for receiving from and transmitting signals to a satellite, and a feed assembly, attached to the dish. This feed assembly is connected via one or two cables referred to as an inter facility link (IFL) to an in door unit (IDU) that processes the information (voice, video or data) received or for transmission, and an outdoor unit (ODU) mounted near the antenna for transmitting a modulated carrier generated by the IDU to the antenna. The feed assembly is placed at the focal point and includes a feed horn, a radio, etc. A feedhorn (or feed horn) is a horn antenna used to convey radio waves between the radio and the dish. The IDU demodulates incoming signals received from the ODU and also operates as an interface between a user's communication equipment and the ODU. Details of VSAT terminals are further provided in U.S. Pat. No. 5,578,972 to Hadden et al., which is incorporated herein by reference in its entirety.

The signals from the satellite, reflected by the dish and converging at the feed horn, are weak and barely detectable after traversing thousands of miles in space. The signals will also have picked up other extraneous signals ("noise"), as they traverse the atmosphere. The feed horn collects the weak reflected signals and passes them on to the radio. The radio amplifies/boosts the weak received signals without amplifying the noise signals and converts the high frequencies of the signals into lower frequencies (i.e., down converting to the IDU). If the high frequencies were conveyed without down conversion, they require the use of wave guides for conveyance.

In a receive mode, the ODU processes Rx signals and outputs useable information, data, video or voice, which can be passed on to the appropriate device connected to the IDU. For example, if the VSAT system is used for internet access, a router, network switch or computer could be connected to the receiver circuit.

In a transmission mode, information is fed into a modulator, which mixes the information with a carrier signal through a process called modulation. The modulator then outputs the modulated signal to the ODU. The ODU amplifies and increases the frequency of the Tx signal and then feeds it to the feed horn. The feed horn then disperses the signal onto the dish, which reflects the Tx signal, in a focused beam towards the satellite.

Other coupling apparatus heretofore utilized contained various combinations of individual components, including multiple filters and transducers, coupled together as required to perform the necessary task of separating the signals to be transmitted from the received signals. The components are used either as individual devices, or as a stand-alone module of assembly of these devices. These individual waveguide devices or assembly module reside outside the transmitter housing. These waveguide devices need to be weather sealed yet they often break leading to water ingress and the eventual failure of the entire radio assembly. This is due to the inherent complex geometry of these devices that typically require split die-casting of the parts, which are then held together using adhesives or other materials to form weather tight bonds. The bonds are the weak spots subject to breakdowns.

Figure 2:
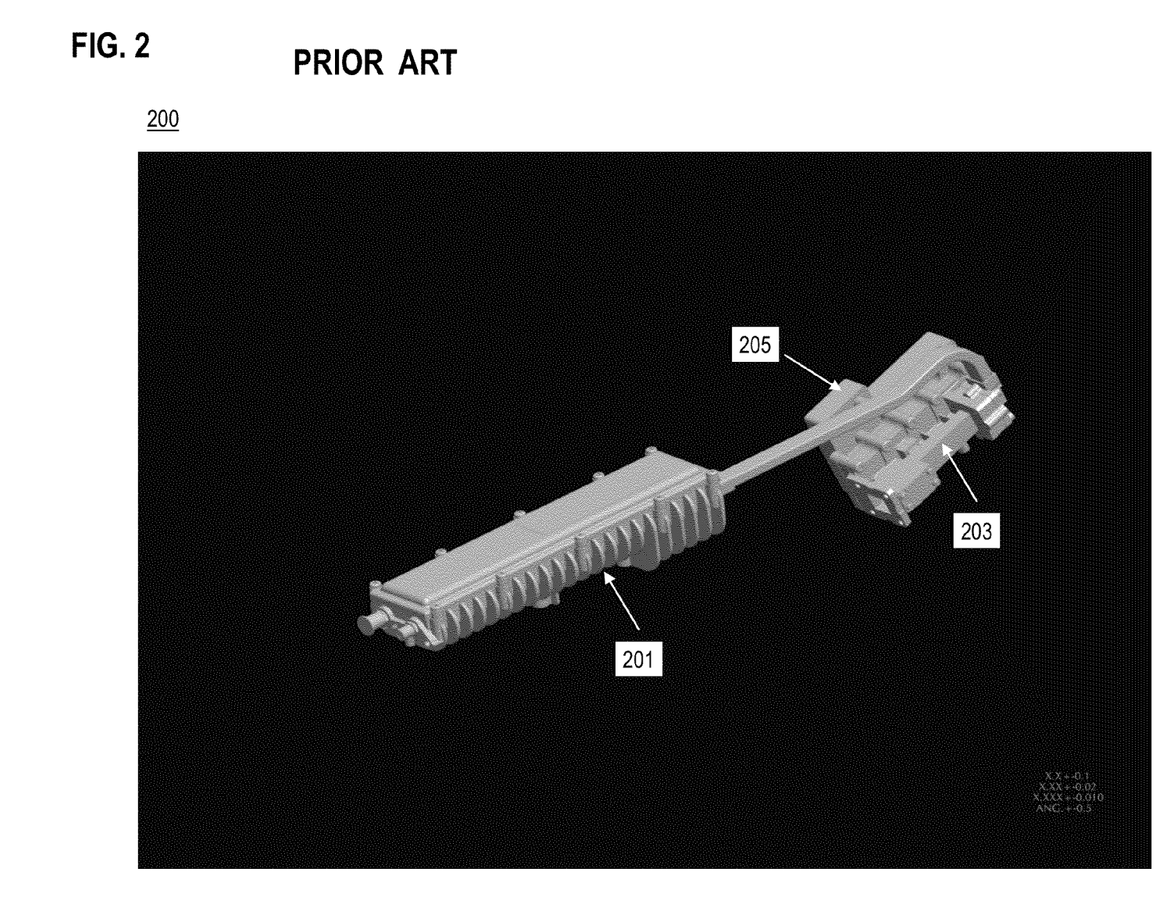
FIG. 2 is a diagram of a prior art radio for use in a microwave communication system.
Figure 3:
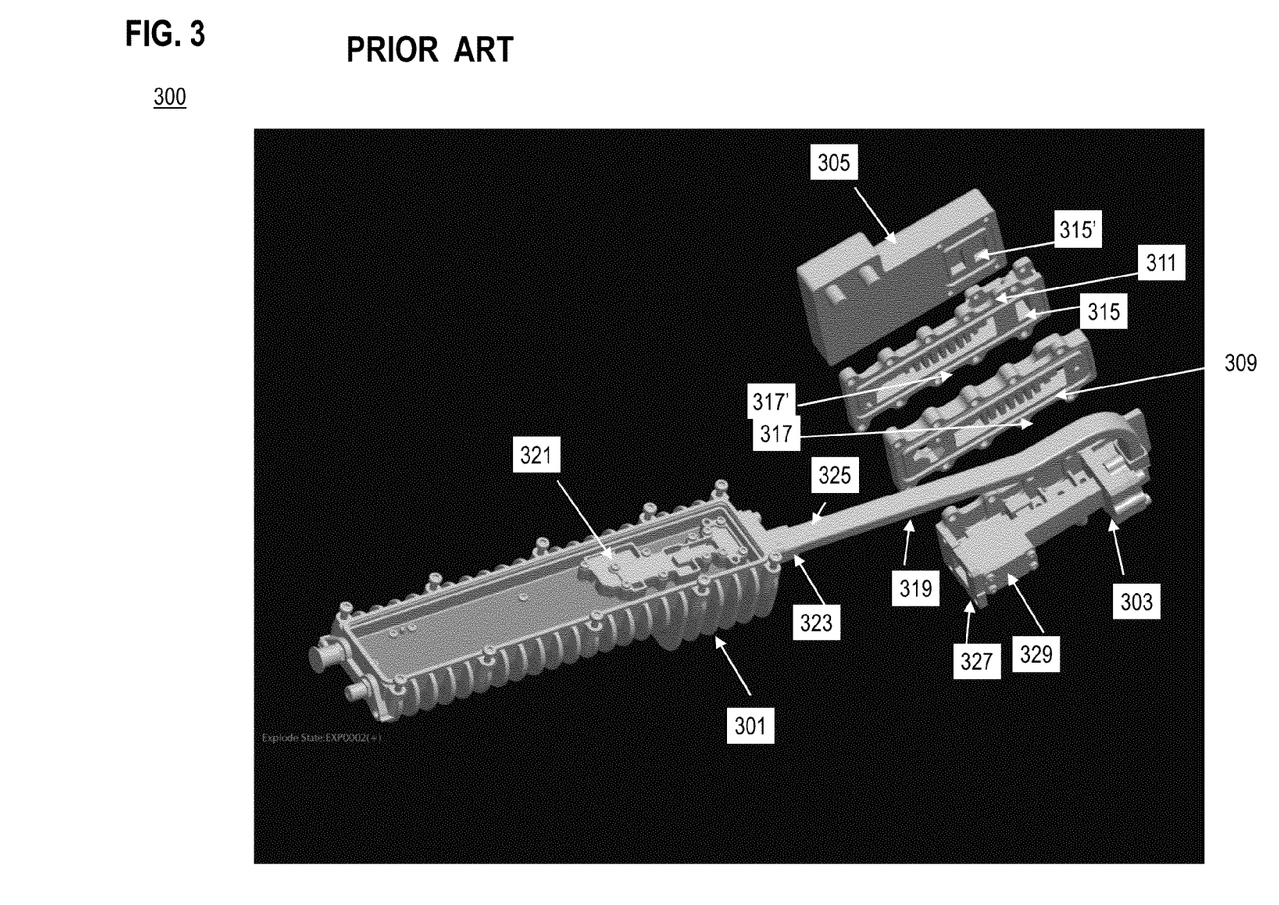
FIG. 3 is an exploded view of the prior art radio of FIG. 2.

FIGS. 2 and 3 are diagrams of an existing radio for use in an ODU of a remote ground terminal (e.g., a VSAT) operating in a Ku frequency band. FIG. 2 is a diagram of a prior art radio for use in a microwave communication system. By way of example, the radio 200 is about 18" long. The radio 200 includes a transmitter housing 201 that contains a transmitter module, a transmit-receive isolation assembly (TRIA) 203, and a low noise block converter (LNB) 205. In particular, the TRIA 203 is formed external to the transmitter housing 201. The LNB 205 is also formed external to the transmitter housing 201.

A transmitter circuit sealed in the housing 201 sends Tx signals from the terminal to the satellite. The transmitter circuit comprises a multiplexer for receiving a modulated data signal from the indoor unit, a phase lock loop (PLL) for frequency stabilizing and multiplying the modulated data signal, and a transmitter for amplifying and frequency multiplying the modulated data signal to generate a modulated carrier signal. The LNB 205 receives Rx signals from the satellite to the terminal. The LNB 205 transforms the received signal into a corresponding intermediate frequency signal. The intermediate frequency signal is then coupled to the IDU via the multiplexer.

The TRIA 203 is a microwave bridge arranged between the LNB 205 and the transmitter circuit, for separating flows of Rx signals from Tx signals. The TRIA 203 is an integrally formed unit that comprises essentially an ortho-mode transducer (OMT) and a diplexer. The OMT separates Rx signals and Tx signals when they have orthogonal polarizations (e.g., one being horizontal while the other being vertical). The diplexer including a split and filter banks, thereby separating Rx signals and Tx signals based upon signals frequencies. Rx signals and Tx signals always have different frequencies. In this case, the Rx signal frequencies are in the range of 10.95-12.75 GHz, while Tx signal frequencies are in the range of 13.75-14.5 GHz.

The diplexer includes two high pass filters and a band pass filter. The band pass filter attenuates signals outside of a predefined receiver bandwidth, in order to prevent possible interference. This radio has a frequency of operation in the Ku band (11-14 GHz).

The radio may also have a voltage standing wave ratio (VSWR), which can also be referred to as return loss, of equal to or less than 1.3:1. The radio may have other electrical performance requirements such as insertion loss and a rejection band. Due to the complexity of the design, the TRIA 203 needs to be produced by die-casting high precision metal such as magnesium, zinc, gold, titanium, etc.

Different services operate on different polarizations. Even on one satellite, there are often services operating simultaneously on the different polarizations. Satellites and antennas with horizontal and vertical polarization schemes are known as linear polarization systems. If the polarization is not properly aligned, the opposite polarization may cause interference. A cross-polarization feed assembly has its receive polarization perpendicular to its transmit polarization. A co-polarization feed assembly has its receive polarization parallel with its transmit polarization. The radio 200 can used in conjunction with a co-polarization feed assembly or a cross-polarization feed assembly.

FIG. 3 is an exploded view of the prior art radio of FIG. 2. Within the housing 301, there is a transmitter module/electronics 321. The metal housing 301 is typically manufactured by metal die-casting, for both protection against the elements and for heat dissipation. In FIG. 3, the LNB 305 is separated from the TRIA 303, and the TRIA 303 is dissembled into three blocks: a main block 307, a second block 309, and a third block 311. The blocks are embodied with the OMT 329 and a diplexer (including a split and filter banks) of the TRIA 303.

A transmit (Tx) port 323 receives a Tx signal from a power amplifier of the terminal. A high-pass Tx filter 319 is built in-between the main block 307 and the second block 309 to let through the transmit signal, while stopping any receive signals from getting therethrough. In particular, the transmit signal is transmitted from the transmitter housing 301, via a transmit port 323 of a transmit waveguide 325, and then via the high-pass Tx filter 319, and exits out of a common port 327 to the satellite.

A receive (Rx) signal from the satellite (typically including an antenna) enters via the common port 327, and passes via the OMT 329 and the diplexer. One band-pass Rx filter 317 (with 8 stages) is built in-between the main block 307 and the second block 309. Another band-pass Rx filter 317' (with 9 stages) is built in-between the second block 309 and the third block 311. The two band-pass Rx filters 317, 317' pass the receive signals therethrough while stopping the transmit signal from getting through. In particular, the receive signal is separated by the OMT 329 into a horizontally polarized receive signal and a vertically polarized receive signal (in order to double to the spectral efficiency by utilizing the same frequency band twice). The horizontally polarized receive signal and the vertically polarized receive signal then respectively travel via the two band-pass Rx filters 317, 317', and exit respectively via receive ports 315, 315'.

The common port 327 connects the TRIA 303 to the satellite, and transmits signals from the transmitter to the satellite therethrough, meanwhile transmitting the receive signals from the satellite into the transmitter. This radio 300 is costly to manufacture, heavy and bulky. First of all, the radio 300 includes many components each of which needs to be die-cast. The components are expensive and time consuming to make, to assemble and to ship. Secondly, the TRIA 303 and the LNB 305 are exposed to weather changes and vulnerable to water leaks. Thirdly, the radio 300 are physically large and heavy such that it requires strong and expensive antennas to support.

As such, there exists a need for a single integrated radio which does not require a plurality of individual components or additional transitions and transformers to be utilized to interface with either the terminal or the satellite.

Figure 4:
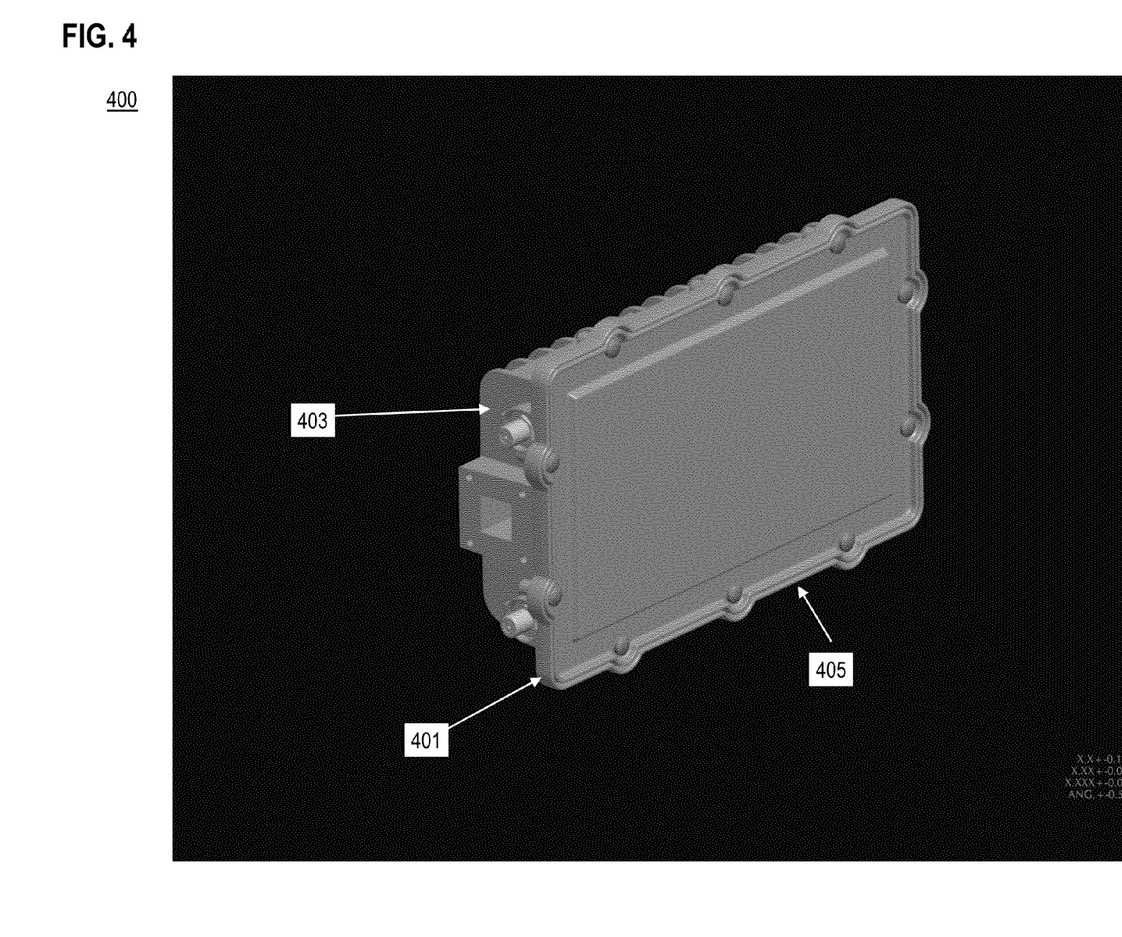
FIG. 4 is a diagram of a radio for use in a microwave communication system, in accordance with an exemplary embodiment.
Figure 5:
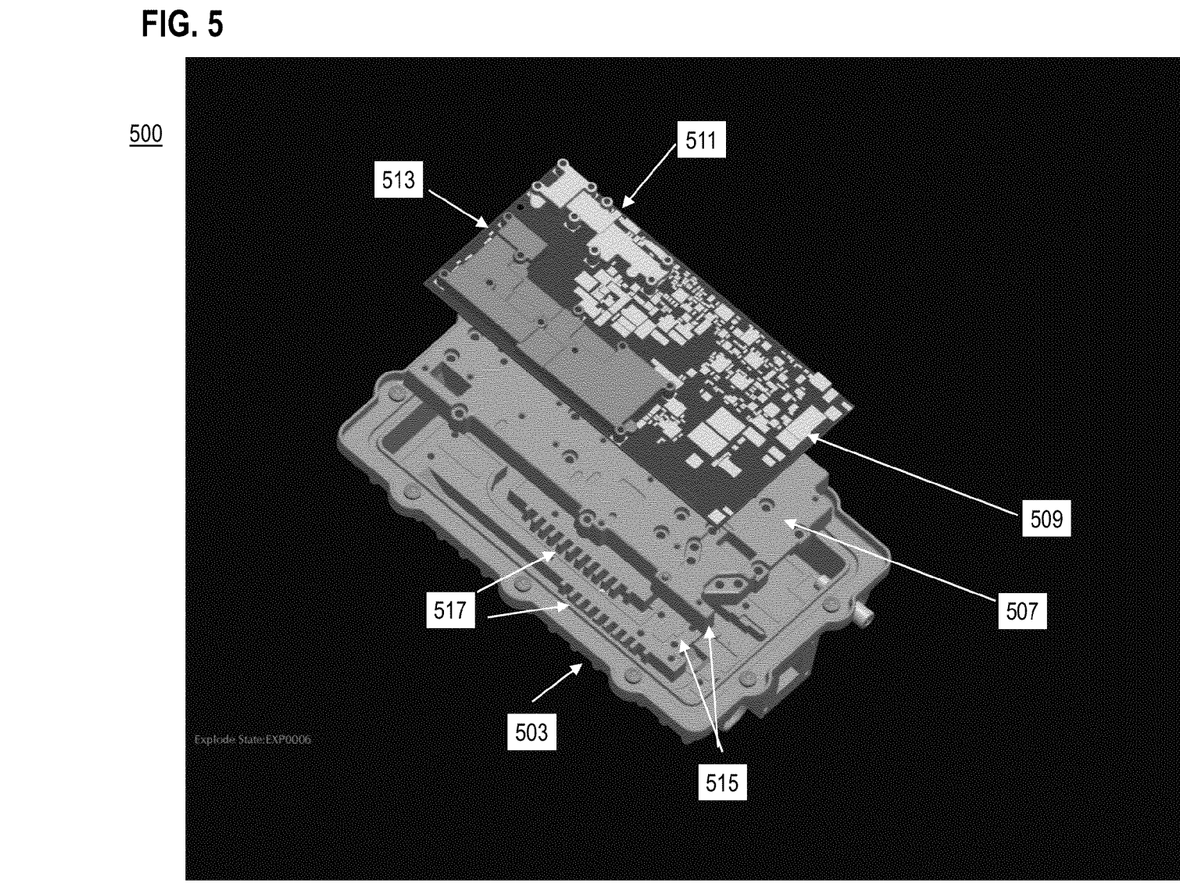
FIG. 5 is an exploded view of the radio of FIG. 4.
Figure 6:
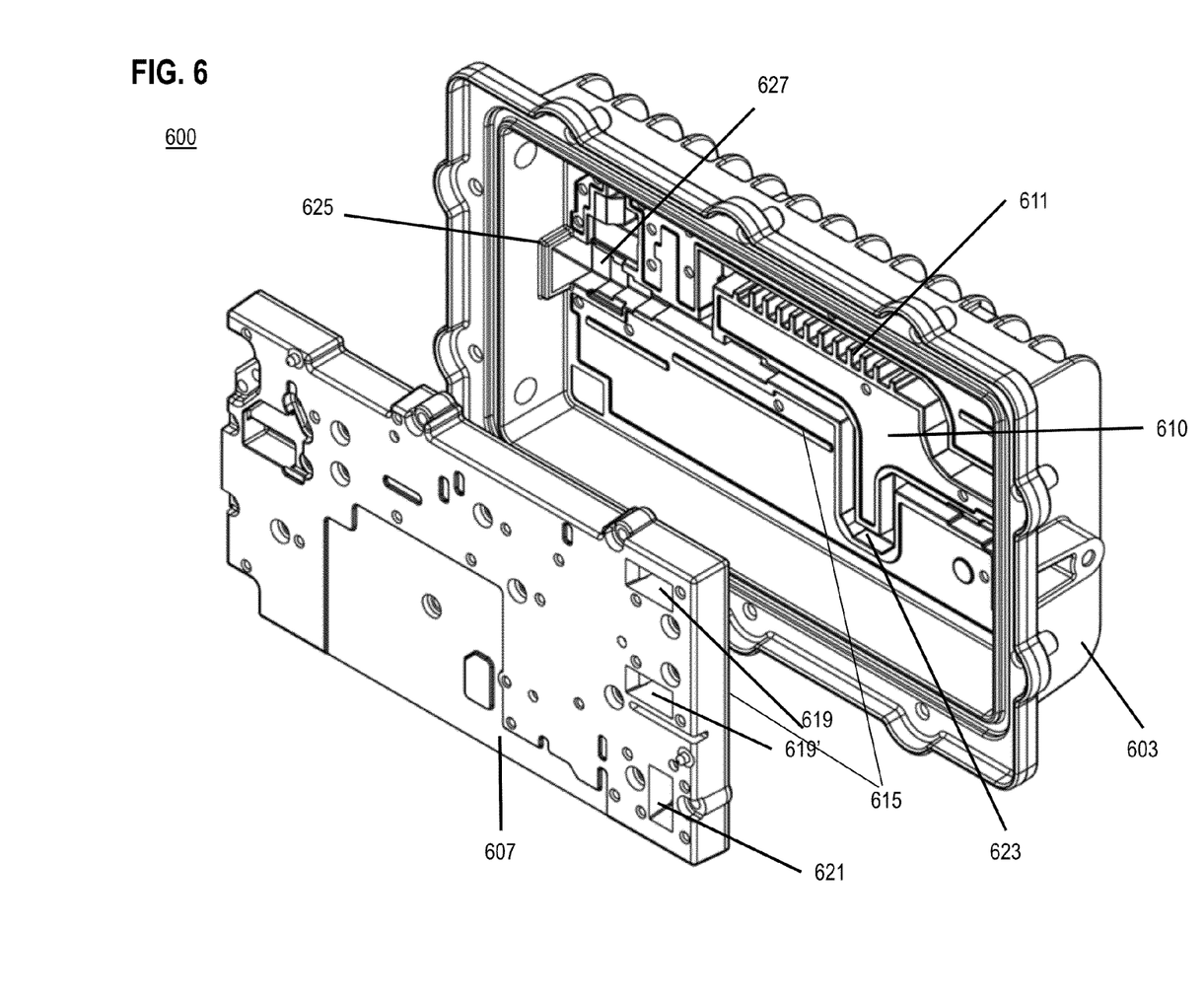
FIG. 6 is a perspective view of a housing and an plate of the radio of FIG. 4.
Figure 7:
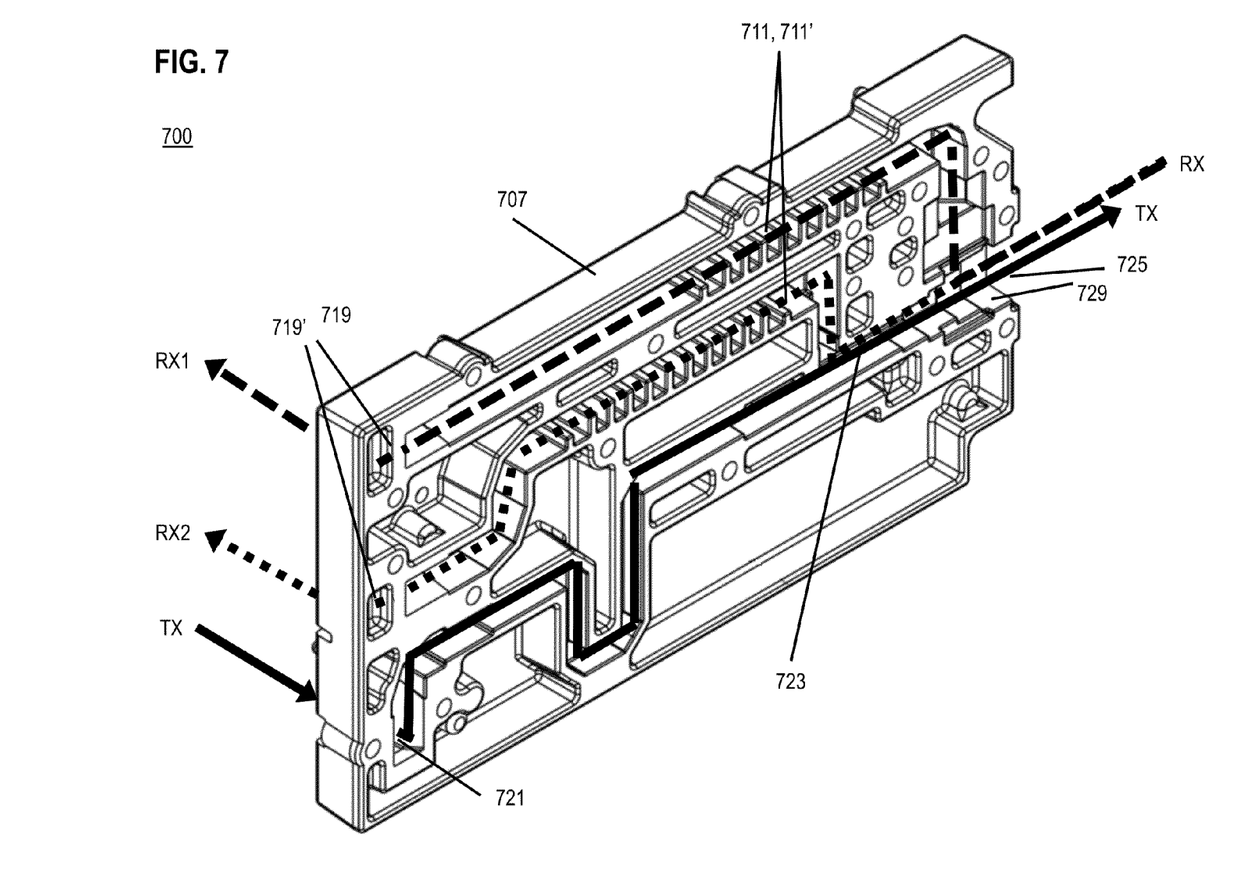
FIG. 7 is a perspective view of a plate of the radio of FIG. 4.

FIGS. 4-7 are diagrams of an integrated radio, according to various exemplary embodiments. FIG. 4 is a diagram of a radio for use in a microwave communication system, in accordance with an exemplary embodiment. In this embodiment, the radio 400 includes a transmitter housing 401 with a upper housing 403 and a lower housing 405. By way of example, the transmitter housing 401 has dimensions of approximately 10 inch×5 inch×2 inch and operates in the Ku band, e.g., 11-14 GHz. FIGS. 5-7 show details of the radio of FIG. 4.

FIG. 5 is an exploded view of the radio of FIG. 4. In FIG. 5, a transmitter housing 501 of a radio 500 seals therein a plate 507 and a circuit board 509. The circuit board 509 includes transmitter electronics 511 and LNB electronics 513 thereon. In some embodiments, at least one of the transmitter electronics 511 and LNB electronics 513 are made of discrete element circuits. In other embodiments, at least one of the transmitter electronics 511 and LNB electronics 513 are burned in one or more semiconductor chips to reduce the size of these components and their manufacturing cost.

The plate 507 is placed in-between the circuit board 507 and the upper housing 503. In particular, an integrated transmit-receive isolation and filtering waveguide (INTRIFWA) 515 is embodied in an inner surface of the upper housing 503 and a surface of the plate 507. The INTRIFWA 515 functions substantially similar to the prior art TRIA. The inner surface of the upper housing 503 is integrally formed with a half of the INTRIFWA structure 515 (including an OMT and a diplexer). The side of the plate 507, which faces the inner surface of the upper housing 503, is integrally formed with the other half of the INTRIFWA 515 (including a transmit port, two receive ports, etc.). FIG. 5 only labels two band-pass Rx filters 517 of the diplexer. Other components of the OMT and the diplexer will be shown in FIGS. 6-7. The transmitter housing 501 and INTRIFWA 515 require high precision metal, and may be produced from metal plated plastic, aluminum, plated magnesium, zinc, gold, titanium, aluminum, alloy (e.g., A356 aluminum alloy).

FIG. 6 is a perspective view 600 of a housing and a plate of the radio of FIG. 4. FIG. 6 shows details of an upper housing 603 and a plate 607, after removing the circuit board therefrom and further separating the housing 603 from the plate 607. In particular, FIG. 6 shows the inner surface of the upper housing 603 that is built-in with a half of an INTRIFWA 615.

The plate 607 includes two receive ports 619 and one transmit port 621. The transmit port 621 receives Tx signals from a power amplifier of an IDU. The Tx signal then passes via the high-pass Tx filter 623 that lets through the transmit signal, while stopping any Rx signals from getting therethrough. The Tx signal then passes via the common port 625 out of the radio 600.

Meanwhile, receive signals are received from a satellite via the common port 625 and separated by a band pass filter 611 and another band pass filter 611' (not shown) into a signal Rx1 and a signal Rx2 (see FIG. 7), which respectively travel via two band-pass Rx filters 611, 611'. The filtered Rx signals exit via two receive ports 619 out of the radio 600. In short, the common port 625 connects to a satellite dish (typically an antenna), and transmit signals from the transmitter to the satellite dish therethrough, meanwhile the receive signals from the satellite dish go through the common port 625 into the transmitter.

An OMT 729 separates passing signals into a horizontally polarized signal and a vertically polarized signal. By way of example, the OMT 627 separates the RF singles of orthogonal polarizations. The ortho-mode transducer (OMT) 627 is integrally forms with the common port 625.

The INTRIFWA 615 is integrally formed with the upper housing 603 such that the receive ports 619, 619' are perpendicular to the common port 625, and the common port 625 is parallel to a length side of the INTRIFWA 615. The INTRIFWA 615 is also integrally formed such that the transmit port 621 is perpendicular to the common port 625. By way of example, the common port 625 has a square-shaped opening, while the transmit port 621 and the receive ports 619, 619' have rectangular-shaped openings. The openings of the receive ports 619, 619' have a longer side in parallel with the length side of the INTRIFWA 615, while the opening of the transmit port 621 619' has a longer side perpendicular to the length side of the INTRIFWA 615.

FIG. 7 is a perspective view of a plate of the radio of FIG. 4. FIG. 7 shows one side of the plate that is built-in with the other half of the INTRIFWA. The plate 707 includes two receive ports 719, 719', one transmit port 721, etc. The transmit port 721 receives a Tx signal from the transmitter's power amplifier of. The Tx signal then passes along a solid line in FIG. 7 via the high-pass Tx filter 723 that lets through the transmit signal, while stopping any Rx signals from getting therethrough. The filter Tx signal then passes out of the radio 700 via the common port 725 with a frequency range of 13.75-14.5 GHz.

Meanwhile, Rx signals with a frequency range of 10.95-12.75 GHz and of two orthogonal polarizations, one co-polarized (parallel) with the Tx signal and the other cross-polarized with (orthogonal to) the Tx signal) are received from a satellite dish via the common port 725. The two Rx polarizations are separated from each other by the OMT 729, into a signal Rx1 which is orthogonally polarized to the Tx signal, and a signal Rx2 which is co-polarized to the Tx signal. The two Rx signals, Rx1 and Rx2 are further separated from the Tx signal in frequency by the band pass filters 711, and another band pass filter 711', respectively. The band-pass Rx filters 711, 711' pass the Rx signals while stopping the Tx signal from getting therethrough. In addition, the Rx1 and Rx2 signals have orthogonal polarizations such that the radio 500 can be used in conjunction with a co-polarization feed assembly or a cross-polarization feed assembly.

The filtered Rx signals exit from two receive ports 719, 719 out of the radio 700. The common port 725 of the INTRIFWA 715 connects to a satellite dish (typically an antenna), and transmit signals from the transmitter to the satellite dish therethrough, meanwhile the receive signals from the satellite dish go through the common port 725 into the transmitter.

By integrating these components inside the housing of the transmitter, the above-discussed embodiments avoid the disadvantages of the existing radios, such as the one shown in FIGS. 2 and 3.

The embodiments depicted in FIGS. 4-7 significantly reduce the manufacturing cost, since the integral waveguide transmit-receive isolation and filtering (INTRIFWA) structure is integrally formed as a part of the transmitter housing. The total number of parts for the entire radio is also reduced, thereby reducing the manufacturing costs. For example, the above-described embodiments requires metal die-casting twp pieces: the upper housing and the plate. On the other hand, the prior art designs require a TRIA assembled from three metal die-casting blocks, a metal die-casting LNB, and a metal die-casting transmitter housing, etc.

In addition, by building the components in the transmitter housing, the tendency of breakdown or water leakage is completely eliminated. As such, the INTRIFWA is much cheaper to maintain (e.g., operation, inventory, etc.) in the long run. Moreover, the INTRIFWA needs not to be weather sealed as it is embodied inside the transmitter housing, which further reduces the manufacturing cost.

Further more, by being part of the transmitter housing, the INTRIFWA takes much less space. For the above reason, the resulting radio with the INTRIFWA is physically much smaller and weighs much lighter. By building the common port, the transmit port, and the receive ports in the transmitter housing and the plate, as well as twisting the transmit port and the receive ports 90 degrees out of the plate, all the Rx and Tx signals travel on the same plane, rather than on different planes as in the prior art design of FIGS. 2-3. Therefore, the size of the radio and the relevant shipping cost are further reduced. By simplifying the number of the radio components as well as the shapes of the radio components, the embodiments of FIGS. 4-7 significantly reduce the packaging processing and cost.

Some of the above-discussed embodiments deploy integrated circuit (IC) in place of the prior-art of discrete-element circuit, to further reduce sizes and costs.

The integrated radios of the present disclosure do not require all its radio components to be sealed within the transmitter housing as the embodiment of FIG. 4. In other embodiments, the transmitter housing seals therein only at least a part of the low noise block converter, at least a part of the transmit-receive isolation assembly, or a combination thereof.

In yet other embodiments, the INTRIFWA includes an ortho-mode transducer and a diplexer. At least a part of the ortho-mode transducer, at least a part of diplexer, or a combination thereof is integrally built in the housing.

In yet other embodiments, the diplexer includes one or more high-pass Tx filters, one or more band-pass Rx filters. At least a part of the one or more high-pass Tx filters, at least a part of the one or more band-pass Rx filters, or a combination thereof is integrally built in the housing. In this case, the Rx signal frequencies are in the range of 10.95-12.75 GHz, while Tx signal frequencies are in the range of 13.75-14.5 GHz.

The integrated radios of the present disclosure do not necessary have one common port, one transit port, and two receive ports as the embodiment of FIG. 4. In other embodiments, the INTRIFWA includes one or more common ports, and at least a part of the one or more common ports is integrally built in the housing. In other embodiments, the INTRIFWA includes one or more transmit ports and one or more receive ports. At least a part of the one or more transmit ports, at least a part of the one or more receive ports, or a combination thereof is sealed in the housing.

In other embodiments, the integrated radios of the present disclosure also include a plate having at least a part of the transmit-receive isolation assembly integrally built in one side thereof. In other embodiments, the plate has the one or more common ports, the at least a part of the one or more transmit ports, at least a part of the one or more receive ports, or a combination thereof integrally built therein.

In other embodiments, the integrated radios of the present disclosure also include a circuit board including transmitter electronics, low noise block converter electronics, or a combination thereof. The plate is positioned in-between the circuit board and the housing.

In other embodiments, transmit signals received via the one or more transmit ports exit the apparatus via the one or more common ports, and receive signals received via the one or more common ports exit the apparatus via two of the receive ports respectively.

In other embodiments, the one or more transmit ports and the one or more receive ports are built in an identical plane defined by the plate and the housing, and axes of the one or more transmit ports are in parallel with axes of the one or more receive ports. In other embodiments, the one or more common ports are built in the identical plane, while the axes of the one or more transmit ports and the axes of the one or more receive ports are perpendicular to axes of the one or more common ports. In other embodiments, at least one of the transmit-receive isolation assembly and the housing is made of aluminum.

The microwave communication system supports a full range of remote ground terminals that support a variety of user applications. Each remote ground terminal has an outdoor transmitter, an antenna and an indoor modem equipped with fully integrated multiplexing solutions with TDM, ATM, and IP interfaces that can simultaneously support all types of traffic. The microwave communication system works with a carrier's platform for offering fiber-quality solutions that encompass voice, video, data, multimedia, and Internet services. The microwave communication system can be deployed to work with backhaul 2G/3G cell sites, Wi-Fi hotspots, and to provide broadband access to multi-tenant offices and residential complexes. With bandwidth management, the microwave communication system is IP-ready with QoS, offers high transmission speed (e.g., 155 Mbps) and ATM IMA interfaces at subscriber terminals. The microwave communication system acts as a universal radio that operates in both point-to-multipoint and point-to-point configuration. The outdoor portion of the terminals of the present disclosure take up less rooftop space and provides better installation options.

Figure 8:
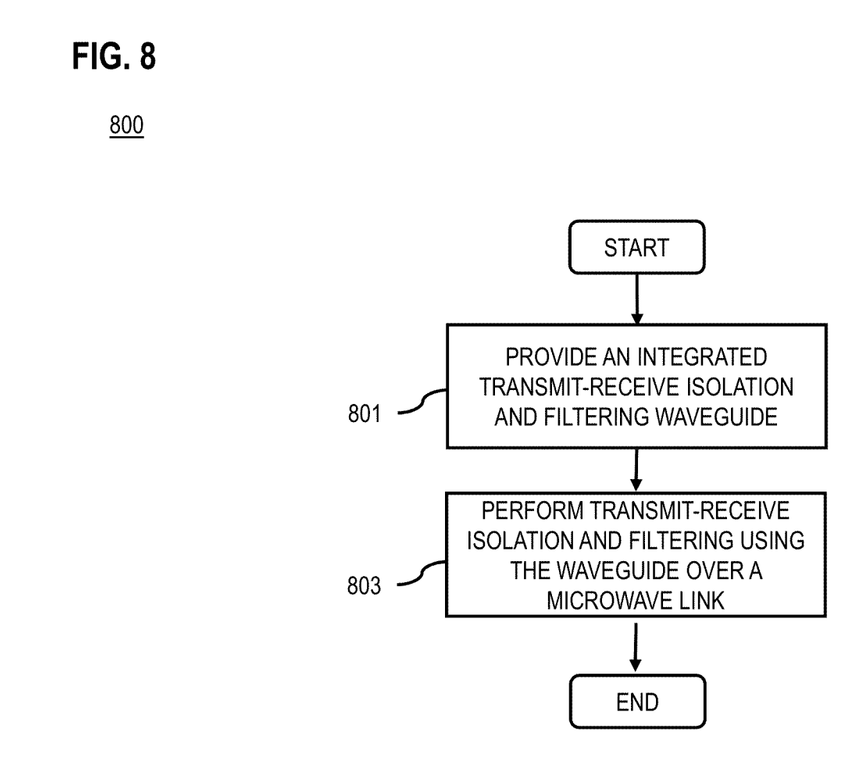
FIG. 8 is a flowchart of a process of using a radio of various exemplary embodiments.

FIG. 8 is a flowchart of a process 800 of using a radio of above-discussed exemplary embodiments. This process 800, by way of example, can be performed by a VSAT of the present disclosure. In one embodiment, the radio 400 in provided in the VSAT (Step 801). In step 803, the VSAT uses the radio 400 to perform transmit-receive isolation and filtering over a microwave link. The VSAT receives and transmits signals in a Ku frequency band, e.g., 10.95-12.75 GHz and 13.75-14.5 GHz respectively.

Figure 9:
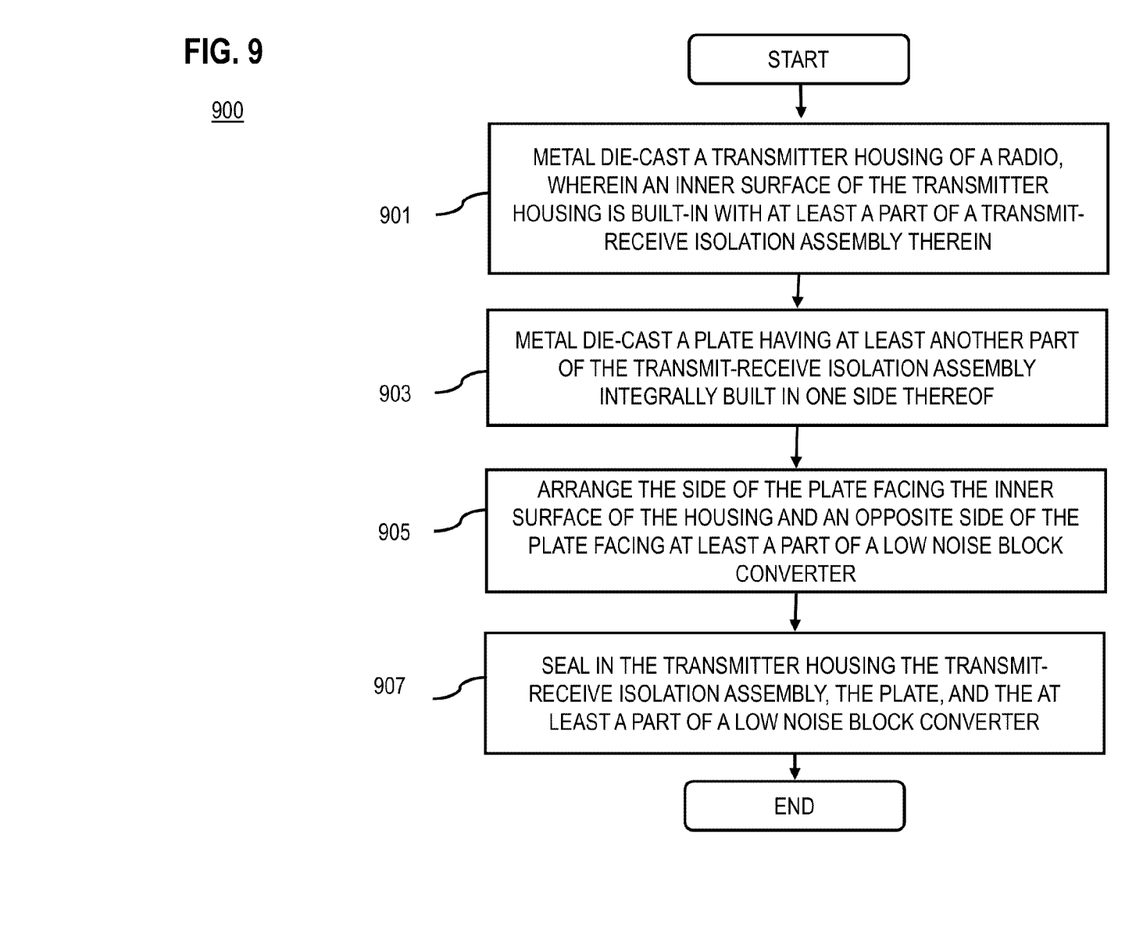
FIG. 9 is a flowchart of a process of producing a radio of various exemplary embodiments.

FIG. 9 is a flowchart of a process 900 of producing a radio of various exemplary embodiments. This process 900, by way of example, can be performed by automated machinery. In one embodiment, the machinery metal die-casts a transmitter housing of the radio, wherein an inner surface of the transmitter housing is built-in with at least a part of a transmit-receive isolation assembly (e.g., the INTRIFWA) therein (Step 901). In step 903, the machinery metal die-casts a plate having at least another part of the transmit-receive isolation assembly integrally built in one side thereof. The inner surface of the transmitter housing and the side of the plate are further built-in with at least a part of one or more common ports, at least a part of one or more transmit ports, at least a part of one or more receive ports, or a combination thereof. The machinery then arranges the side of the plate facing the inner surface of the housing and an opposite side of the plate facing at least a part of a low noise block converter (Step 905). Thereafter, the machinery seals in the transmitter housing: the transmit-receive isolation assembly, the plate, and the at least a part of a low noise block converter (Step 907).

Figure 10:
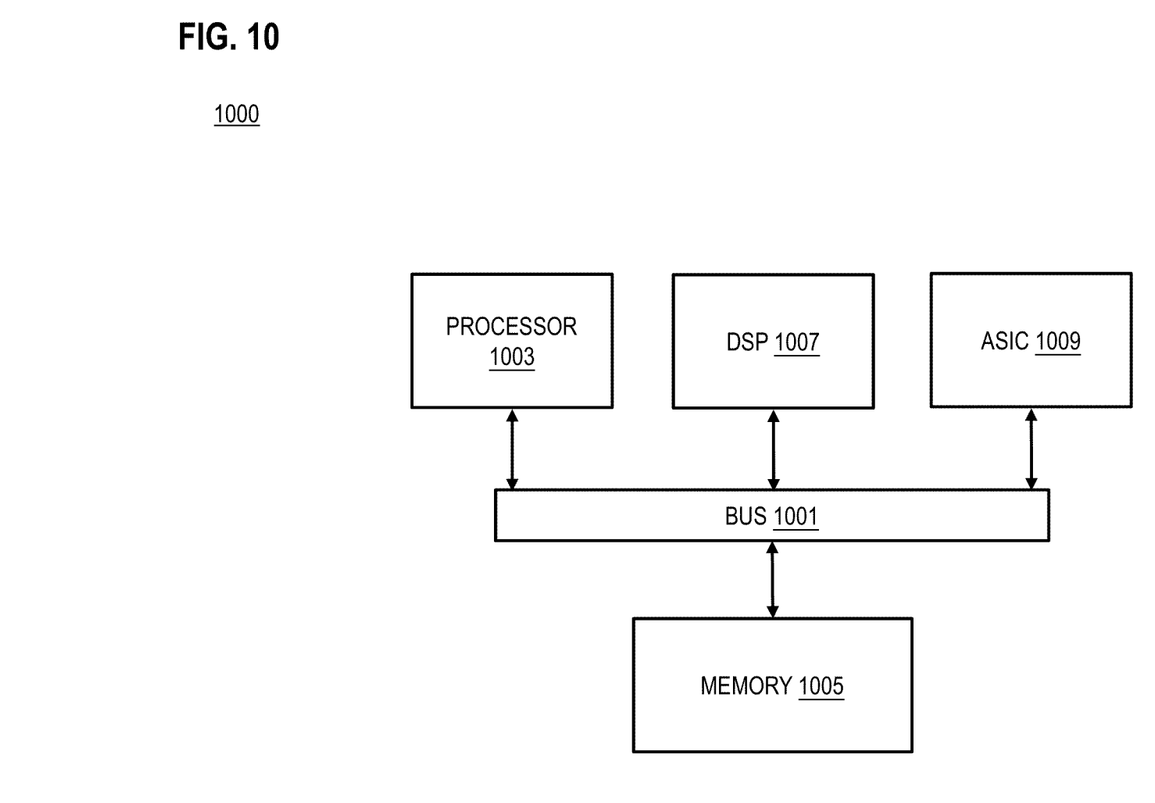
FIG. 10 is a diagram of a chip set that can be used to implement various exemplary embodiments.

FIG. 10 is a diagram of a chip set used in the machinery described in conjunction with FIG. 9 for producing a radio of various exemplary embodiments. Chip set 1000 includes, for instance, the processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps for controlling a direct current gain of a resonant converter to increase power efficiency within a circuit.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein for controlling a direct current gain of a resonant converter to increase power efficiency within a circuit. The memory 1005 also stores the data associated with or generated by the execution of the inventive steps.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. An apparatus, comprising:
a transmitter;
a transmitter housing;
a low noise block converter;
a transmit-receive isolation assembly; and
one or more common ports, one or more transmit ports, and one or more receive ports;
wherein at least a part of the low noise block converter and at least a part of the transmit-receive isolation assembly are sealed within the transmitter housing, and the at least a part of the transmit-receive isolation assembly is integrally built into the transmitter housing;
wherein the transmit-receive isolation assembly includes an ortho-mode transducer and a diplexer, and at least a part of the ortho-mode transducer and at least a part of the diplexer are integrally built into the transmitter housing; and
wherein at least a part of one or more of the common ports, the transmit ports and the receive ports are integrally built into the transmitter housing, and the at least a part of the one or more of the common ports, the transmit ports and the receive ports are integrally built into a plate within the transmitter housing.

2. An apparatus of claim 1, wherein receive signals and transmit signals passed via the one or more common ports are separated by the ortho-mode transducer into one or more horizontally polarized signals and one or more vertically polarized signals.

3. An apparatus of claim 2, wherein receive signals and transmit signals are separated by the diplexer based upon frequencies thereof, and exit via the one or more transmit ports and/or the one or more receive ports.

4. An apparatus of claim 1, wherein the diplexer includes one or more high-pass transmit filters and one or more band-pass receive filters, and one or more of at least a part of the one or more high-pass transmit filters and at least a part of the one or more band-pass receive filters is integrally built into the transmitter housing.

5. An apparatus of claim 1, wherein the plate has at least a part of the transmit-receive isolation assembly integrally built into one side thereof.

6. An apparatus of claim 5, further comprising:
a circuit board including one or more of transmitter electronics and low noise block converter electronics, wherein the plate is positioned in-between the circuit board and the transmitter housing.

7. An apparatus of claim 6, wherein transmit signals received via the one or more transmit ports exit the apparatus via the one or more common ports, and receive signals received via the one or more common ports exit the apparatus via the one or more receive ports, respectively.

8. An apparatus of claim 7, wherein the one or more transmit ports and the one or more receive ports are built in an identical plane defined by the plate and the transmitter housing, and axes of the one or more transmit ports are in parallel with axes of the one or more receive ports.

9. An apparatus of claim 8, wherein the one or more common ports are built in the identical plane, while the axes of the one or more transmit ports and the axes of the one or more receive ports are perpendicular to axes of the one or more common ports.

10. An apparatus of claim 9, wherein at least one of the transmit-receive isolation assembly and the housing is made of aluminum.

11. A method for producing a transmit/receive microwave radio, comprising:
metal die-casting a transmitter housing; and
metal die-casting a plate configured to be sealed within the transmitter housing;
wherein at least a part of a transmit-receive isolation assembly is integrally cast into the transmitter housing;
wherein the transmit-receive isolation assembly includes an ortho-mode transducer and a diplexer, and at least a part of the ortho-mode transducer and at least a part of the diplexer are integrally cast into the transmitter housing; and
wherein at least a part of one or more common ports, transmit ports and receive ports are integrally cast into the plate.

12. A method for producing a transmit/receive microwave radio according to claim 11, the one or more common ports are configured such that receive signals and transmit signals passed via the one or more common ports are separated by the ortho-mode transducer into one or more horizontally polarized signals and one or more vertically polarized signals.

13. A method for producing a transmit/receive microwave radio according to claim 12, the diplexer is configured such that receive signals and transmit signals are separated by the diplexer based upon frequencies thereof, and exit via the one or more transmit ports and/or the one or more receive ports.

14. A method for producing a transmit/receive microwave radio according to claim 11, wherein the diplexer is configured to include one or more high-pass transmit filters and one or more band-pass receive filters, and one or more of at least a part of the one or more high-pass transmit filters and at least a part of the one or more band-pass receive filters is integrally cast into the transmitter housing.

15. A method for producing a transmit/receive microwave radio according to claim 11, wherein the plate has at least a part of the transmit-receive isolation assembly integrally cast into one side thereof.

16. A method for producing a transmit/receive microwave radio according to claim 15, further comprising:
  forming a circuit board including one or more of transmitter electronics and low noise block converter electronics, wherein the plate is positioned in-between the circuit board and the transmitter housing.

17. A method for producing a transmit/receive microwave radio according to claim 16, wherein the transmit/receive microwave radio is configured such that transmit signals received via the one or more transmit ports exit the radio via the one or more common ports, and receive signals received via the one or more common ports exit the radio via the one or more receive ports, respectively.

18. A method for producing a transmit/receive microwave radio according to claim 17, wherein the one or more transmit ports and the one or more receive ports are built in an identical plane defined by the plate and the transmitter housing, and axes of the one or more transmit ports are in parallel with axes of the one or more receive ports.

19. A method for producing a transmit/receive microwave radio according to claim 18, wherein the one or more common ports are built in the identical plane, while the axes of the one or more transmit ports and the axes of the one or more receive ports are perpendicular to axes of the one or more common ports.

20. A method for producing a transmit/receive microwave radio according to claim 19, wherein at least one of the transmit-receive isolation assembly and the housing is made of aluminum.

* * * * *